United States Patent Office 3,486,843
Patented Dec. 30, 1969

3,486,843
PROCESS FOR SEPARATING EUROPIUM FROM OTHER RARE EARTHS
Otto Smetana and Leo Hafner, Carinthia, Austria, assignors to Treibacher Chemische Werke Aktiengesellschaft, Treibach, Austria
No Drawing. Filed July 5, 1967, Ser. No. 651,145
Claims priority, application Austria, July 7, 1966, A 6,524/66; Oct. 19, 1966, A 9,733/66
Int. Cl. C22b 59/00
U.S. Cl. 23—22
8 Claims

ABSTRACT OF THE DISCLOSURE

Europium present in an aqueous solution of rare earth sulphates is reduced to its bivalent form, is then precipitated by the addition of $Sr^{2+}$ or $Ba^{2+}$ ions, and recovered from the sulphate precipitate.

---

Industrially, europium is separated from other rare earths (RE) by precipitation from an aqueous solution of the RE-chlorides, of the sparingly soluble europium (II) sulphate or a mixture thereof with barium sulphate, the latter being much less soluble even than the europium (II) sulphate. The process is carried out in such a way that the slightly acid chloride solution of the RE, which is free of heavy metals and other interfering substances, is reduced by means of zinc amalgam until the entire europium is present in the bivalent form. Thereafter, the solution of a barium salt and of a sulphate are successively added to the liquid, whereupon barium sulphate containing europium precipitates. The precipitation of the europium is however incomplete, for the starting solutions, which most frequently have to be worked up, contain little europium; frequently more than one third of the europium employed escapes precipitation. In place of barium sulphate, strontium sulphate can also be used as a collecting agent for $Eu(II)SO_4$ but this is not to be recommended because strontium sulphate is considerably more readily soluble than barium sulphate and can therefore co-precipitate even less europium than can barium sulphate.

According to U.S. Patent 3,092,449, a considerably more advantageous Eu isolation can be achieved if a sulphate solution of the RE is used instead of a chloride solution. First of all, any heavy metals which may be present in the solution, which is contained in a closed vessel, are precipitated out by stirring with zinc dust for several hours. The precipitate is separated from the solution. After displacing air by carbon dioxide, further zinc dust is added, followed by a solution of sodium sulphate or potassium sulphate, whereupon sparingly soluble alkali-RE double sulphates which co-precipitate the europium as europium (II) sulphate precipitate after several hours stirring. In this way, more than 90% of the europium can be precipitated even from poor starting solutions. However, the process of the abovementioned patent recommends precipitating 5–10% of the RE employed together with the europium. As a result of this large amount, the europium is able to become only slightly enriched in the sulphate precipitate. Thus, according to this patent, a solution having an Eu concentration of 0.05 parts by weight of $Eu_2O_3$ per 100 parts by weight of $RE_2O_3$ (this ratio of $Eu_2O_3$ to the total RE oxides subsequently being described as ε) gave a sulphate precipitate having a value of ε=0.44. The Eu enrichment was thus 0.44/0.05~9. Accordingly it was relatively slight. However frequently not even this value is attained, since solutions of alkali-RE double salts show a great tendency to supersaturation and retarded precipitation, which make it necessary to add more precipitating agent than is inherently necessary in order to be able reliably to precipitate the predetermined proportion of RE.

These disadvantages can be avoided by means of the present invention. It is characterized by precipitating the bivalent europium from an RE sulphate solution with the aid of strontium or barium sulphate as the collecting agent. The process according to the present invention consists of converting the europium present in an aqueous solution of sulphates of rare earths into its bivalent form by reduction, then precipitating it by the addition of strontium or barium ions and isolating it from the sulphate precipitate so produced.

In the case of precipitation by strontium ions a high Eu yield and, a strong enrichment in the sulphate precipitate is achieved, which can rise to a hundred times the ε-value of the starting solution. The strontium sulphate containing the europium can be easily processed further and the strontium can be easily recovered. It is also not necessary to separate the heavy metals which separate out before the europium precipitation from the solution; on the contrary, the europium can be precipitated directly on the heavy metal precipitate. This renders the process significantly simpler.

When precipitating the europium (II) ion from sulphate solutions by means of barium ions instead of strontium ions, the europium can again be precipitated in excellent yield but its enrichment in the precipitate is not as great as in the case of $SrSO_4$; the precipitate is also significantly more difficult to filter, wash and process further.

It has been found that the alkaline earth-europium sulphate is further enriched by stirring with dilute acids, especially with dilute sulphuric acid, with exclusion of air, since a part of the RE contained in the precipitate, but only very little europium, is dissolved. The solution poor in europium, which is formed on filtering the washed precipitate, can be added to the next batch for dissolving the raw material. The crude alkaline earth-europium sulphate which has been further enriched in this way can be worked up into pure europium compounds in a manner which is in itself known. This is particularly easy and simple when using strontium ions as the precipitant.

The temperature of the solution on precipitating the europium should be below 40° C. and preferably even below 25° C. At least 2, but advantageously at least 4 g-equivalents of strontium or barium ions should be added per g-equivalent of europium.

The advantages of the present process are only achieved if it is applied to solutions whose anions consist entirely or at least predominantly of sulphate ions. These advantages do not arise with the chloride solutions which have hitherto almost exclusively been used.

The following examples illustrate the invention without limiting it:

EXAMPLE 1

Calcined crude didymium oxide, which was obtained on dressing monazite after separating the cerium and the greater part of the lanthanum, was dissolved in dilute sulphuric acid. The solution had the following composition:

| | |
|---|---|
| Free $H_2SO_4$ | 0.04 N |
| Cu _____g./l__ | 0.003 |
| $NO_3$ _____g./l__ | 0.06 |
| $RE_2O_3$ _____g./l__ | 57 |

Per 100 g. of $RE_2O_3$:

| | |
|---|---|
| $La_2O_3$ g | 8 |
| $Ce_2O_3$ g | 0.6 |
| $Pr_2O_3$ g | 9.5 |
| $Nd_2O_3$ g | 52.2 |
| $Sm_2O_3$ g | 11.6 |
| $Eu_2O_3$ g | 0.275 |
| $Y_2O_3$ g | 5.9 |
| $Gd_2O_3$, $Dy_2O_3$ and other RE oxides g | 11.9 |

3,000 l. of the solution warmed to 25° C. were introduced into a closed stirring unit, the air was displaced by $CO_2$ and 7.5 kg. of technical grade zinc dust (93% metallic zinc) were slowly added with constant stirring. After two hours stirring, the entire europium had been converted to the bivalent form. Thereupon 45 l. of a 1 N $SrCl_2$ solution were added with stirring over the course of 5 minutes, this amounting to 5.5 g. equivalents of $Sr^{2+}$ per g. equivalent of Eu, and the mixture was stirred for a further 6 hours. Thereafter the solution had a pH-value of 2.5. After filtering, 15 kg. of a crude strontium-europium sulphate remained which contained 11.5% of $RE_2O_3$, of which 453 g. were $Eu_2O_3$ ($\epsilon=26$), as well as excess metallic zinc. This precipitate was suspended in 58 l. of water, 2.4 kg. of concentrated sulphuric acid followed by 0.12 kg. of zinc dust were added, and the mixture was thoroughly stirred for two hours and filtered. 4.1 kg. of a strontium-europium sulphate were produced which contained 33% $H_2O$, 19% $RE_2O_3$, 449 g. of $Eu_2O_3$ ($\epsilon=58$) and 15% of metallic zinc. The filtrate, amounting to 62 l., contained 16 g. of $RE_2O_3$ per liter and 0.06 g. of $Eu_2O_3$ per liter. It was added to the next batch for the manufacture of crude strontium-europium sulphate.

The result of this working-up is a europium yield of about 96% of the amount employed and an increase of the $\epsilon$-value from 0.275 to 58, i.e. more than 200-fold.

EXAMPLE 2

90 l. of the same solution as in example 1 were stirred with 200 g. of zinc powder in a closed vessel after displacing the air with $CO_2$, 1500 ml. of a 1 N $BaCl_2$ solution were added with constant stirring one hour later, and the mixture was stirred for a further 12 hours. The precipitate, which was fairly difficult to filter, was washed with a little water. It weighed 520 g. and contained 17.0% $RE_2O_3$ with $\epsilon=15.5$. 97% of the europium employed had been precipitated. The precipitate was suspended in 1800 ml. of water and 80 g. of concentrated sulphuric acid, followed a little later by 5 g. of zinc dust, were added. After two hours stirring, the mixture was filtered and (the residue) washed with 200 ml. of water. The precipitate weighed 310 g. It contained 20% of water, and 13.5% of $RE_2O_3$ of which 4.3% were $Eu_2O_3$. This corresponds to $\epsilon=32$. 98% of the europium contained in the first sulphate precipitate were recovered in this precipitate.

These alkaline earth and europium sulphates can be further processed to give pure europium compounds, in a known manner. This is particularly easy for the strontium-europium sulphate.

What we claim is:

1. Process of purifying europium, comprising the steps of preparing an aqueous solution of tervalent europium and other tervalent rare earth metal salts, the anions of which consist at least predominantly of sulfate ions, subjecting the europium-containing solution at a temperature below 40° C. to conditions selectively reducing the tervalent europium to bivalent europium, thereby producing a solution of bivalent europium ions and soluble tervalent ions of other rare earth metals, precipitating the bivalent europium ions by adding to the solution $Sr^{2+}$ or $Ba^{2+}$ ions in excess of the stoichiometric amount, separating the precipitate containing residual amounts of the other rare earth metal salts from the mother liquor, suspending the precipitate in water, adding concentrated sulphuric acid and zinc dust to the aqueous suspension, while excluding oxygen, stirring the suspension thoroughly for several hours to dissolve the other rare earth metal salts, and filtering.

2. The process of claim 1, wherein the solution is prepared in sulphuric acid and the ions are entirely sulfate ions.

3. The process of claim 2, wherein the solution has a pH of 1.4.

4. The process of claim 3, wherein the tervalent europium is reduced to bivalent europium by stirring the acidic solution with zinc dust.

5. The process of claim 3, wherein at least two gram-equivalents of the strontium or barium ions are added to the solution per gram-equivalent of europium.

6. The process of claim 5, wherein strontium ions are added to the solution.

7. The process of claim 3, wherein the temperature does not exceed 25° C.

8. The process of claim 7, wherein the tervalent europium is reduced to bivalent europium by stirring the solution with zinc dust for two hours, while excluding air, at least two gram-equivalents of ion per gram-equivalent of europium are then added to the solution slowly in the form of a strontium or barium chloride solution, stirring is continued for several hours, and the solution is filtered.

References Cited

UNITED STATES PATENTS

| | | | |
|---|---|---|---|
| 3,092,449 | 6/1963 | Bril et al. | 23—22 |
| 3,153,571 | 10/1964 | Bronaugh | 23—23 |

HERBERT T. CARTER, Primary Examiner

U.S. Cl. X.R.

23—117, 23